United States Patent [19]

Schlossberg

[11] 3,842,367

[45] Oct. 15, 1974

[54] TECHNIQUE AND APPARATUS FOR STABILIZING THE FREQUENCY OF A GAS LASER

[75] Inventor: Howard Schlossberg, Lexington, Mass.

[73] Assignee: The United States of America as represented by the Secretary of the Air Force, Washington, D.C.

[22] Filed: Apr. 25, 1973

[21] Appl. No.: 354,263

[52] U.S. Cl. ............................................. 331/94.5
[51] Int. Cl. ............................................. H01s 3/10
[58] Field of Search ................................... 331/94.5

[56] References Cited
UNITED STATES PATENTS 3,686,585   8/1972   Javan et al. ......................... 331/94.5

Primary Examiner—William L. Sikes
Attorney, Agent, or Firm—Harry A. Herbert, Jr.; Jacob N. Erlich

[57] ABSTRACT

A technique for stabilizing the frequency of a gas laser at a desired value which utilizes an apparatus having an absorption cell containing a gas and a pair of plates therein through which the output of the laser is twice passed. An RF electric field and an AF field are applied to the gas in order to induce DC absorption sidelobes therein. By detecting whether the output radiation has been absorbed by the gas the laser output can be locked to a desired frequency.

5 Claims, 1 Drawing Figure

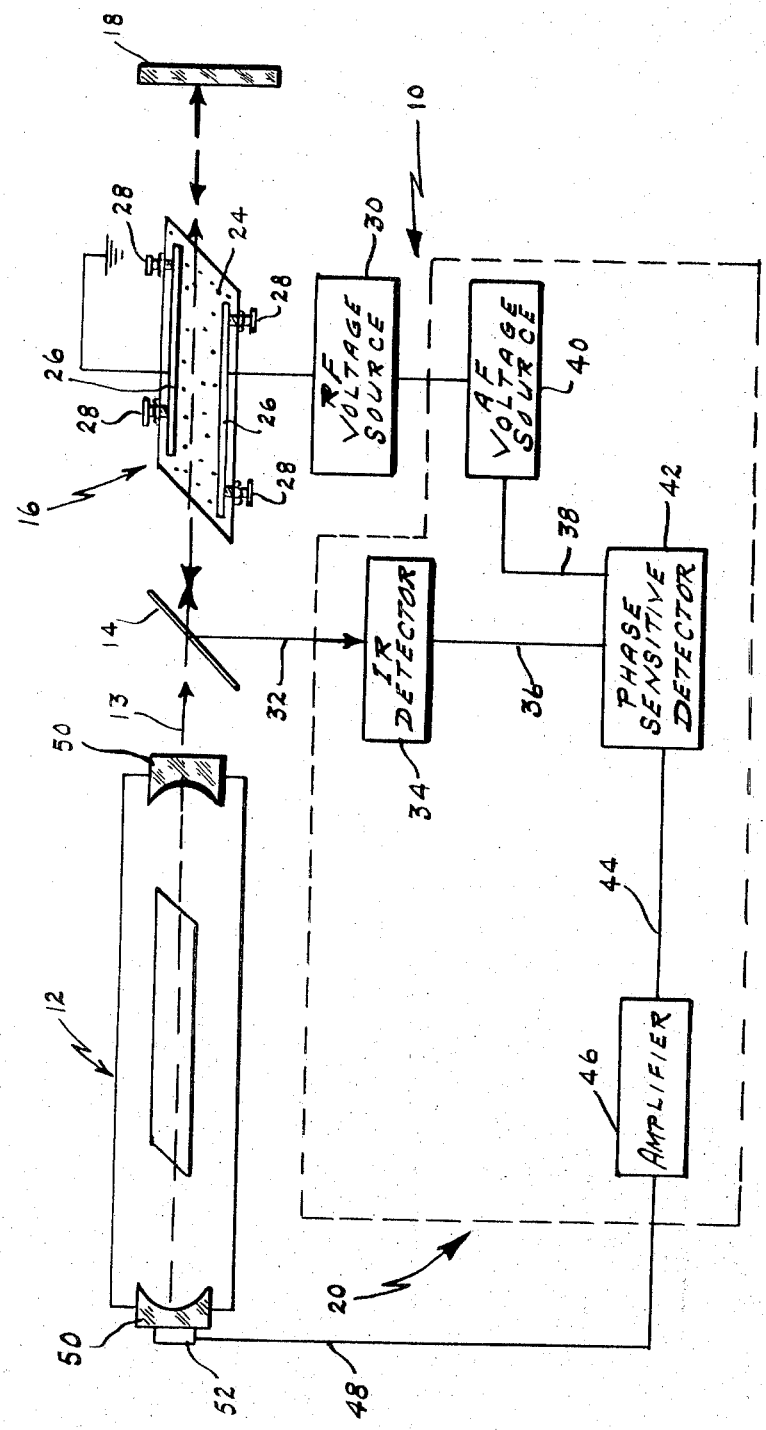

TECHNIQUE AND APPARATUS FOR STABILIZING THE FREQUENCY OF A GAS LASER

BACKGROUND OF THE INVENTION

This invention relates generally to lasers and more particularly to a technique and apparatus for stabilizing the frequency of a gas laser at a preselected value.

In recent years extensive research and development has been devoted to radar and space communications systems. In particular, gas lasers such as the $CO_2$ waveguide gas laser has formed an essential part of such systems. It has been found that space communications systems, for example, depend upon a very stable local oscillator or laser with frequencies determined by the Doppler shifts from targets or sources. Heretofore, however, there has been a lack of means capable of controlling and stabilizing the frequency of a gas laser at a preselected value over a broad band. Without such equipment the economics and reliability of such radar and space communications systems leave much to be desired.

SUMMARY OF THE INVENTION

The instant invention sets forth a technique and apparatus which overcomes the problems set forth hereinabove and which reliably and economically stabilize the frequency of a gas laser at a preselected value.

The instant invention utilizes the output of a high pressure waveguide laser and twice passes this output through an absorption cell. Within this cell is an absorbing gas with a first order Stark effect and an absorption line centered near the desired operating frequency of the laser. Plates are also provided within the cell in order to subject the gas therein to a uniform RF electrical field at a frequency which is the difference between the desired operating frequency and the center of the absorption line of the gas. By furthermore keeping the pressure of the absorbing gas sufficiently low such that (1) the absorption line of the gas is Doppler broadened and (2) the pressure linewidth is less than the applied RF frequency, DC absorption "sidelobes" will be induced in the absorbing gas. By varying the RF electrical field applied to the gas a variety of such sidelobes can be produced. It is the use of these sidelobes in conjunction with the laser output and a phase sensitive detecting system which controls the frequency of the broad gas laser and stabilizes or locks this frequency at a desired value.

It is therefore an object of this invention to provide a technique for stabilizing the frequency of a gas laser at a preselected value.

It is another object of this invention to provide an apparatus for stabilizing the frequency of a gas laser at a preselected value.

It is still another object of this invention to provide a technique and apparatus for stabilizing the frequency of a gas laser at a preselected value which is economical, highly reliable and which lend themselves to standard mass producing and manufacturing techniques.

For a better understanding of the present invention together with other and further objects thereof reference is made to the following description taken in conjunction with the accompanying drawing and its scope will be pointed out in the appended claims.

DESCRIPTION OF THE DRAWING

The only FIGURE of the drawing is a schematic illustration of the apparatus for stabilizing the frequency of a gas laser at a preselected value.

DETAILED DESCRIPTION OF THE PREFERRED EMBODIMENT

Reference is now made to the only FIGURE of the drawing which shows in schematic fashion the apparatus 10 for stabilizing the output frequency of a gas laser at a predetermined value. The apparatus 10 of this invention is made of any suitable gas waveguide laser such as a high pressure $CO_2$ waveguide laser 12 described by T. J. Bridges, E. G. Burkhardt and P. W. Smith in Applied Physics Letter, Vol. 20, page 403 (May 15, 1972). The output 13 of laser 12 is optically connected by any conventional directing means such as beam splitter 14 to an absorption or gas cell 16, a reflecting means such as mirror 18 and a phase sensitive detecting system 20 in a manner to be disclosed in detail hereinbelow.

The output 13 of gas laser 12 must be passed twice through the absorption cell 16 before being redirected by beam splitter 14 to phase sensitive detecting system 20. This is accomplished by any suitable reflecting means such as mirror 18 located proximate one end of cell 16. Cell 16 contains an absorbing gas 24, such as methyl fluoride, therein. This gas 24 should exhibit a first order Stark effect and have an absorption line centered near the desired operating frequency of laser 12. A pair of metal plates 26 are mounted by any conventional securing means such as adjustment screws 28 within cell 16. An RF voltage source 30 and any suitable AF voltage source 40 are electrically connected to plates 26 in the manner shown in the drawing. Plates 26 thereby subject gas 24 to a uniform RF electric field and low AF field. For the apparatus 10 of this invention to operate the applied RF electric field is set at a frequency which is the difference between the desired operating frequency for output 13 of laser 12 and the frequency of the center of the absorption line of gas 24 contained within cell 16.

It is essential for the technique set forth with the instant invention that the pressure of the absorbing gas 24 during application of the RF electric field thereto be sufficiently low that (1) the absorption line of gas 24 be Doppler broadened and (2) the linewidth of the absorption gas 24 be substantially less than the RF frequency applied thereto. With the maintenance of the above mentioned operating conditions DC absorption "sidelobes" will be induced in the absorbing gas 24.

At substantially the center of the sidelobe a characteristic frequency behavior known as the Lamb Dip takes place. Gas 24 within cell 16 is capable of absorbing radiation at the frequency of the center of the sidelobe or Lamb Dip. By varying the RF electric field from RF voltage source 30, a variety of sidelobes can be produced. The output 13 of laser 12 is stabilized or locked at the desired frequency when the radiation of output 13 is absorbed by gas 24 within cell 16.

In order to adjust output 13 of waveguide laser 12 until it is stabilized at the desired operating frequency (i.e., absorbed by gas 24 within cell 16) a conventional phase sensitive detecting system 20 such as described in Lansing Research Corporation Product Catalog 314 (1/69) is utilized in conjunction with output 32 which has been twice passed through cell 16. Phase sensitive detecting system 20 is made up of a conventional IR detector 34 which receives optical signal 32 from laser 12 and converts this signal into an electrical signal 36 indicative of whether an absorption of the output radiation at the desired frequency has taken place within cell 16. Electrical signal 36 is utilized in a conventional manner with a suitable incoming signal 38 from AF voltage source 40 as a reference in phase sensitive detector 42. The resultant error signal 44 (if any) is amplified by any suitable amplifier 46 to provide a signal 48 with which to adjust laser 12 until the output 13 therefrom is of a frequency capable of being absorbed by gas 24 within cell 16. This adjustment is accomplished by the movement of one of the reflectors 50 of laser 12 by a conventional piezoelectric mirror adjustment 52 under the influence of signal 48. Proper adjustment is achieved when the radiation of output 13 is at the frequency at the center of the prescribed sidelobe produced within gas 24 and is absorbed thereby. By merely altering the RF frequency supplied by RF voltage source 30 to plates 26 the output 13 of laser 12 can be stabilized or locked to the frequency at the center of a variety of sidelobes within gas 24.

Although this invention has been described with reference to a particular embodiment it will be understood to those skilled in the art that this invention is also capable of a variety of alternate embodiments within the spirit and scope of the appended claims.

I claim:

1. An apparatus for stabilizing the output of a laser at a desired frequency comprising an absorption cell in optical alignment with said laser output, means operably connected to said laser and to said absorption cell for passing said laser output twice through said absorption cell, said cell containing a gas and a pair of plates therein, an RF voltage source and an AF voltage source electrically connected together and to said plates for subjecting said gas to an RF field and an AF field in order to induce DC absorption sidelobes in said gas, said gas exhibiting a first order Stark effect, having an absorption line centered near the desired frequency for the laser output and having a pressure sufficiently low that (a) the absorption line of said gas is Doppler broadened and (b) the linewidth of said gas is substantially less than the RF frequency applied thereto, a phase sensitive detecting system operably connected to said AF voltage source and to the output emanating from said absorption cell after being twice passed therethrough, and means operably connecting said phase sensitive detecting system to said laser for varying said laser output in accordance with a signal from said phase sensitive detecting system whereby by applying said RF field at a frequency which is the difference between the desired operating frequency for the laser output and the frequency of the center of the absorption line of said gas said laser output can be locked to said desired frequency.

2. An apparatus for stabilizing the output of a laser at a desired frequency as defined in claim 1 wherein said phase sensitive detecting system comprises means operably connected to said output emanating from said absorption cell for converting said absorption cell output into an electrical signal indicative of whether an absorption of the laser output radiation at the desired frequency has taken place within said cell.

3. An apparatus for stabilizing the output of a laser at a desired frequency as defined in claim 2 wherein said means for passing said laser output twice through said absorption cell is a beam splitter located at one end of said cell and a mirror located at the other end thereof.

4. An apparatus for stabilizing the output of a laser at a desired frequency as defined in claim 3 wherein said plates are adjustably mounted within said cell.

5. A method for stabilizing the output of a laser at a desired frequency comprising the steps of:
   a. twice passing the output of a laser through a gas which exhibits a first order Stark effect and has an absorption line centered near the desired frequency for said laser output and has a pressure sufficiently low that the absorption line of said gas is Doppler broadened and the linewidth is substantially less than an RF frequency applied thereto,
   b. applying said RF field and an AF field to said gas in order to induce DC absorption sidelobes therein, said RF field being maintained at a frequency which is the difference between the desired operating frequency for the laser output and the frequency of the center of the absorption line of said gas,
   c. analyzing the output after having twice passed through said gas in order to determine whether an absorption of the laser output at the desired frequency has taken place, and
   d. utilizing said analysis in order to vary the laser output in accordance therewith thereby producing a laser output which is locked to said desired frequency.

* * * * *